(12) United States Patent
Knight et al.

(10) Patent No.: US 11,161,695 B1
(45) Date of Patent: Nov. 2, 2021

(54) SYSTEM FOR LIFTING AND TRANSPORTING AN AIRCRAFT

(71) Applicant: AGE Logistics Corporation, Monrovia, CA (US)

(72) Inventors: Mark Knight, Farnborough (GB); Russ Kobaly, Sewickley, PA (US); Jim Sameth, Monrovia, CA (US)

(73) Assignee: AGE Logistics Corporation, Monrovia, CA (US)

( * ) Notice: Subject to any disclaimer, the term of this patent is extended or adjusted under 35 U.S.C. 154(b) by 0 days.

(21) Appl. No.: 16/992,325

(22) Filed: Aug. 13, 2020

Related U.S. Application Data

(63) Continuation-in-part of application No. 16/901,792, filed on Jun. 15, 2020.

(51) Int. Cl.
*B64D 3/00* (2006.01)
*B64F 1/22* (2006.01)
(Continued)

(52) U.S. Cl.
CPC .................. *B65G 7/06* (2013.01); *B64D 3/00* (2013.01); *B64F 1/224* (2013.01); *B66F 3/24* (2013.01);
(Continued)

(58) Field of Classification Search
CPC ...... B60S 9/00; B60S 9/02; B60S 9/10; B60S 9/12; B60S 9/14; B60S 9/20; B66F 3/24;
(Continued)

(56) References Cited

U.S. PATENT DOCUMENTS 3,185,238 A  5/1965 Edwin
3,513,935 A  5/1970 Noble
(Continued)

FOREIGN PATENT DOCUMENTS

JP  59163230  9/1984

OTHER PUBLICATIONS

AMS Aircraft Lifting Airbags. AMS Aircraft Recovery Ltd. (Published at least as early as Jun. 14, 2020).
(Continued)

*Primary Examiner* — Tyrone V Hall, Jr.
*Assistant Examiner* — Makena S Markman
(74) *Attorney, Agent, or Firm* — Jeffrey G. Sheldon; Katherine B. Sales; Cislo & Thomas LLP

(57) ABSTRACT

A system for lifting and transporting an aircraft comprising a movable platform, a lower lift system, and a first pair of wheels. The platform comprises a frame having an upper and a lower surface and a plurality of hook ups. The lower lift system is configured to raise the platform and an aircraft supported by the frame. The lower lift system comprises a lifter selected from the group consisting of: at least one hydraulic jack, at least one pneumatic jack, slots for forklift arms, at least one inflatable airbag, and combinations of any or all of the foregoing. The first pair of wheels are coupled to or configured for coupling to the frame so that the raised platform with an aircraft supported by the platform can be transported. A method of using the system comprises positioning the system beneath an aircraft and lifting the platform and the aircraft.

8 Claims, 14 Drawing Sheets

(51) Int. Cl.
*B66F 3/40* (2006.01)
*B66F 3/35* (2006.01)
*B66F 3/46* (2006.01)
*B65G 7/06* (2006.01)
*B66F 3/24* (2006.01)

(52) U.S. Cl.
CPC ............... *B66F 3/35* (2013.01); *B66F 3/40* (2013.01); *B66F 3/46* (2013.01)

(58) Field of Classification Search
CPC .... B66F 3/247; B66F 3/25; B66F 3/35; B66F 3/40; B64F 1/224; B64F 5/00; B64F 5/10; B64F 5/40; B64F 5/50; B64D 3/00
USPC ........................................ 254/93 HP; 414/676
See application file for complete search history.

(56) References Cited

U.S. PATENT DOCUMENTS

| | | | |
|---|---|---|---|
| 3,822,761 A | 7/1974 | Vaughen | |
| 4,237,992 A * | 12/1980 | Bristow | E04G 1/14 |
| | | | 180/116 |
| 4,397,054 A * | 8/1983 | Lee, Jr. | B23G 1/22 |
| | | | 254/93 HP |
| 4,461,455 A * | 7/1984 | Mills | B64F 5/50 |
| | | | 180/125 |
| 9,327,751 B2 * | 5/2016 | Nou | B62B 3/04 |
| 9,580,188 B2 * | 2/2017 | Endres | B64F 1/04 |
| 10,093,450 B2 | 10/2018 | Embleton et al. | |
| 2010/0294175 A1 * | 11/2010 | Cummins | F16F 9/54 |
| | | | 108/57.12 |
| 2014/0217343 A1 * | 8/2014 | Sefrin | B66F 17/00 |
| | | | 254/93 HP |
| 2018/0141792 A1 * | 5/2018 | Baas | B66F 3/35 |

OTHER PUBLICATIONS

AMS Fuselage Lifting System (FLS). AMS Aircraft Recovery Ltd. (Published at least as early as Jun. 14, 2020).
Aircraft Transporter System. AMS Aircraft Recovery Ltd. (Published at least as early as Jun. 14, 2020).
Pictures of Boom Fingers used by the Navy. (Published at least as early as Jun. 14, 2020).
Schematic Drawing of Boom Fingers used by Navy. (Published at least as early as Jun. 14, 2020).
Aircraft Recovery System from Vetter & PT Hydraulics Australia. Dec. 26, 2012. https://www.youtube.com/watch?v=v5S0kG4SfpE.
Transporter Hydraulic Lift Assist. AMS Aircraft Recovery Ltd. (Published at least as early as Jun. 14, 2020).
U.S. Appl. No. 16/901,792, Office Action dated Oct. 14, 2020. 17 pages.

* cited by examiner

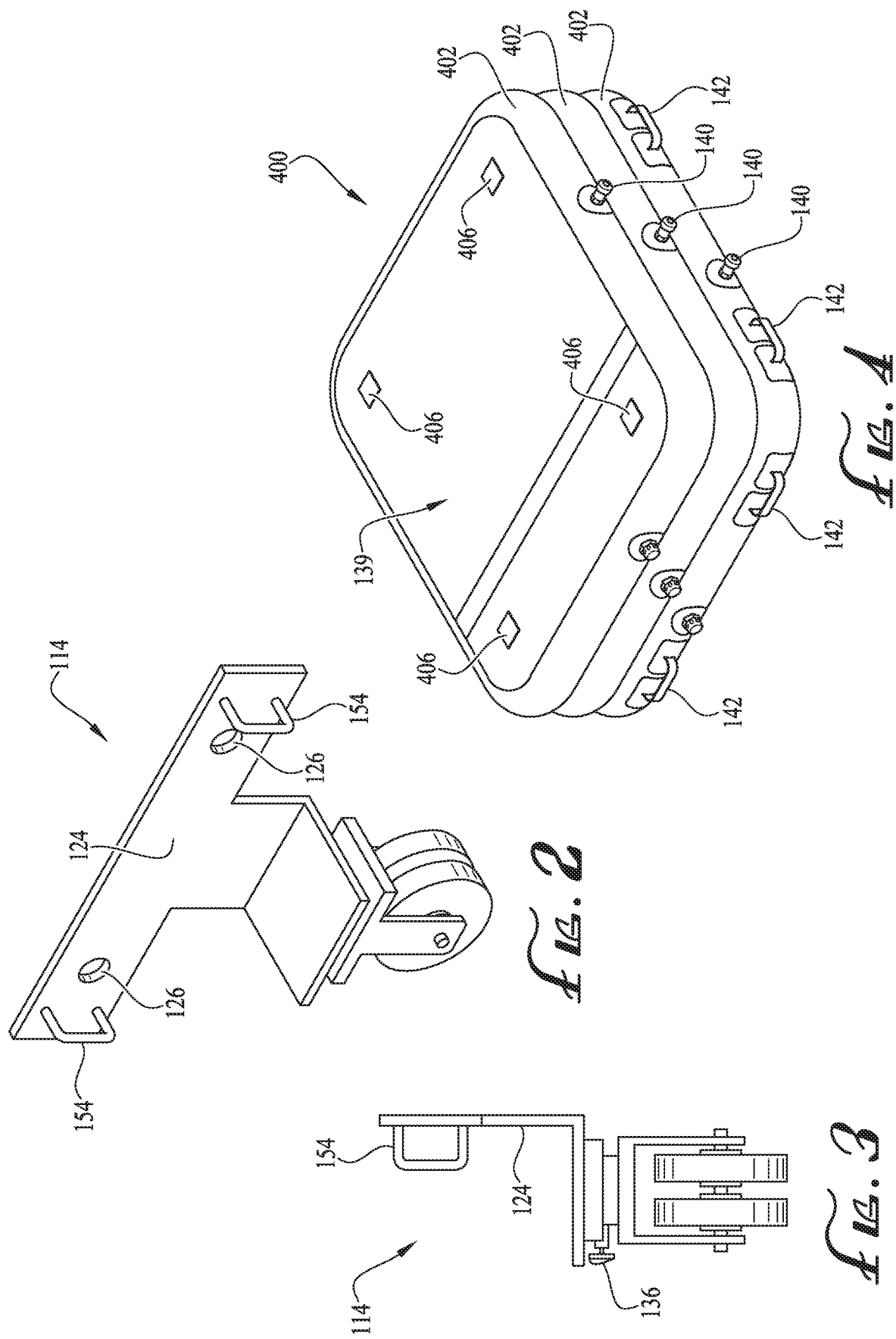

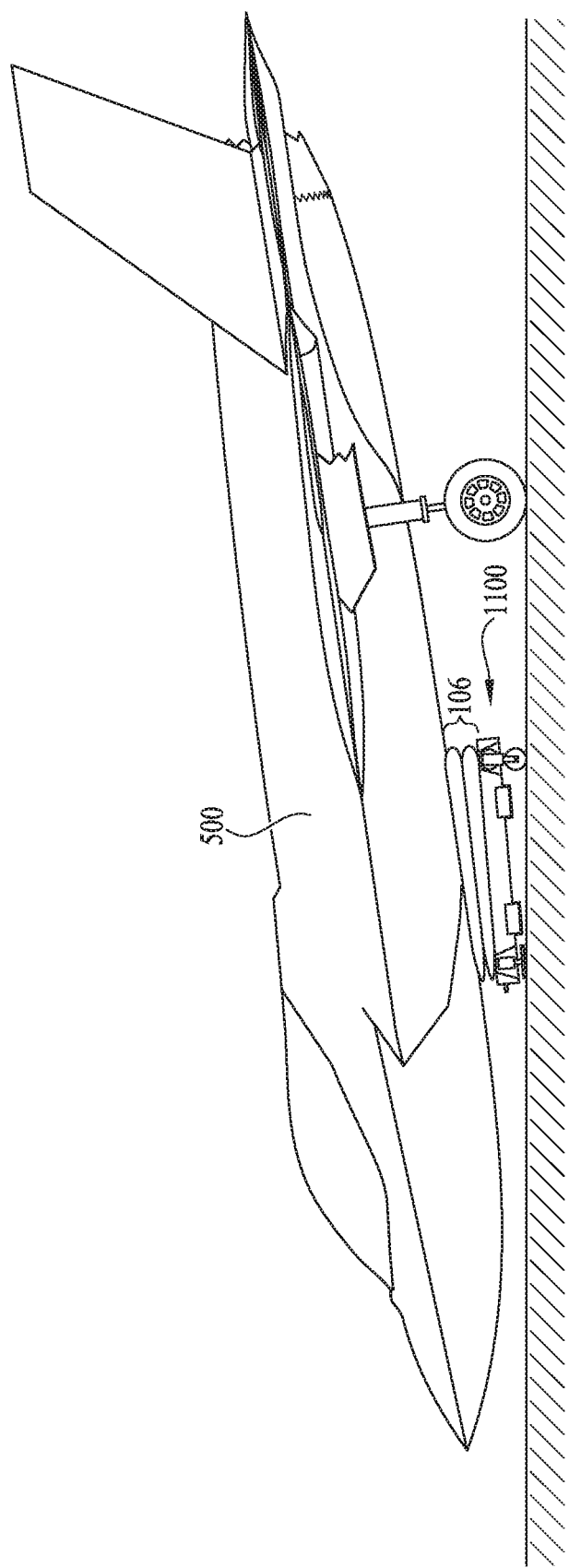

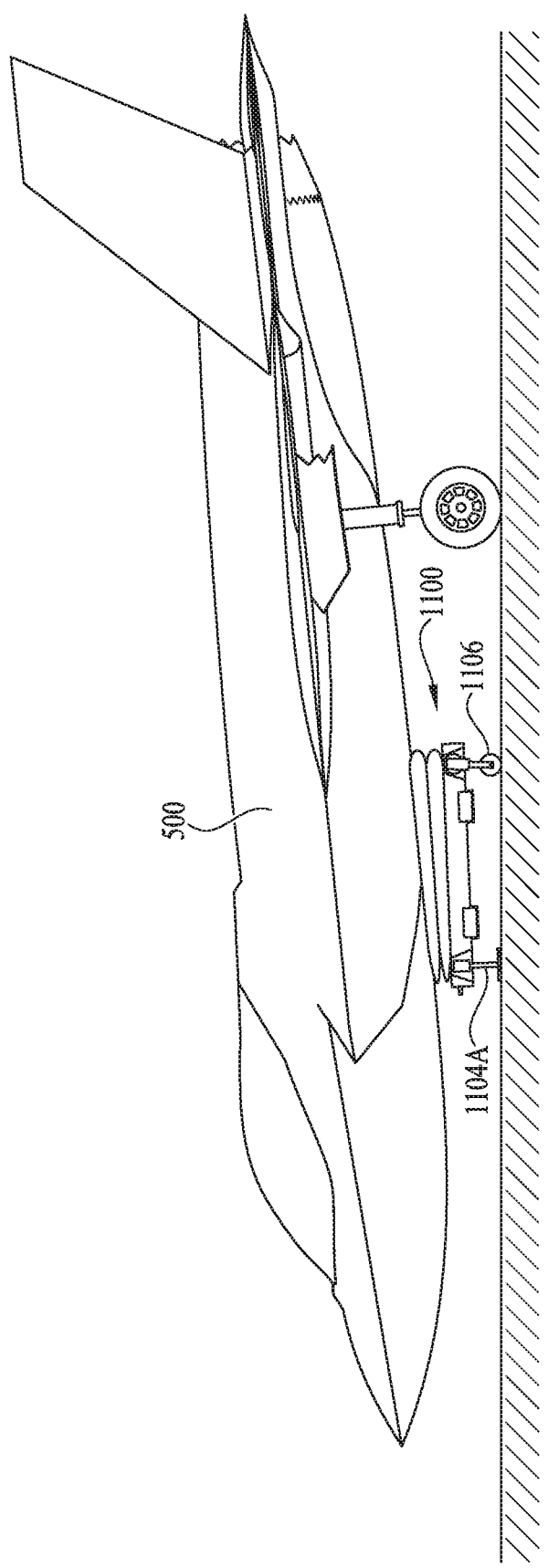

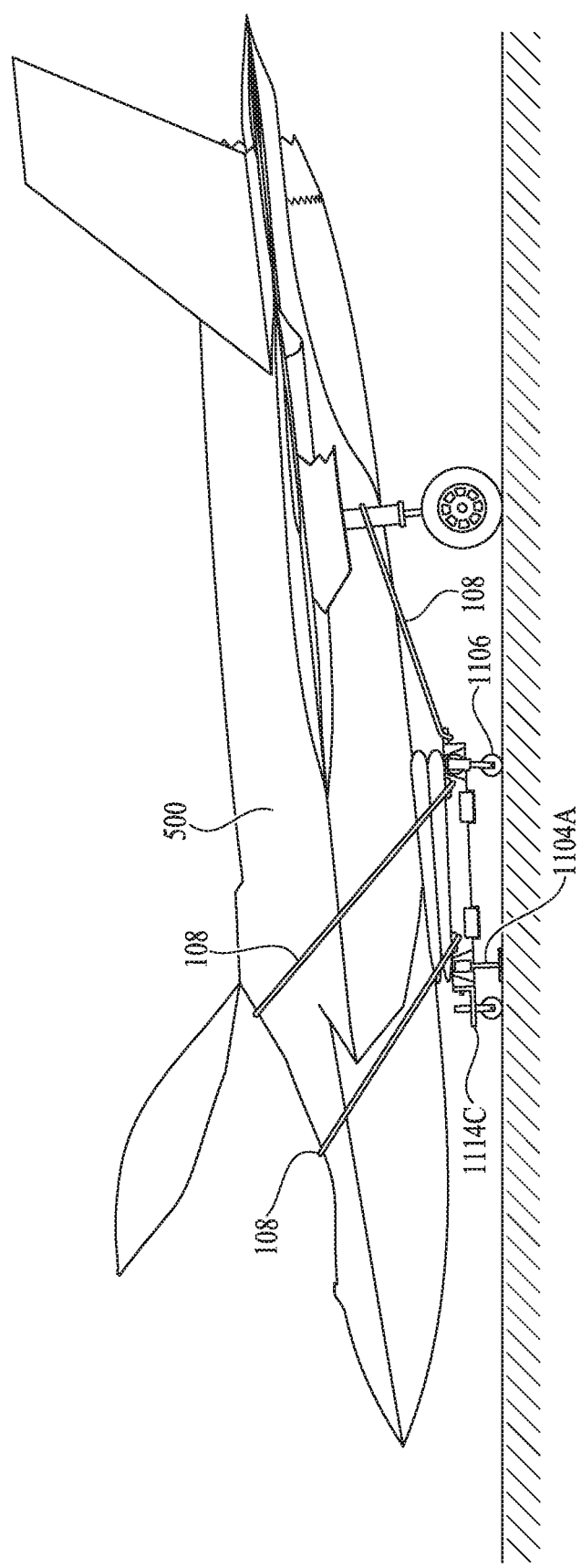

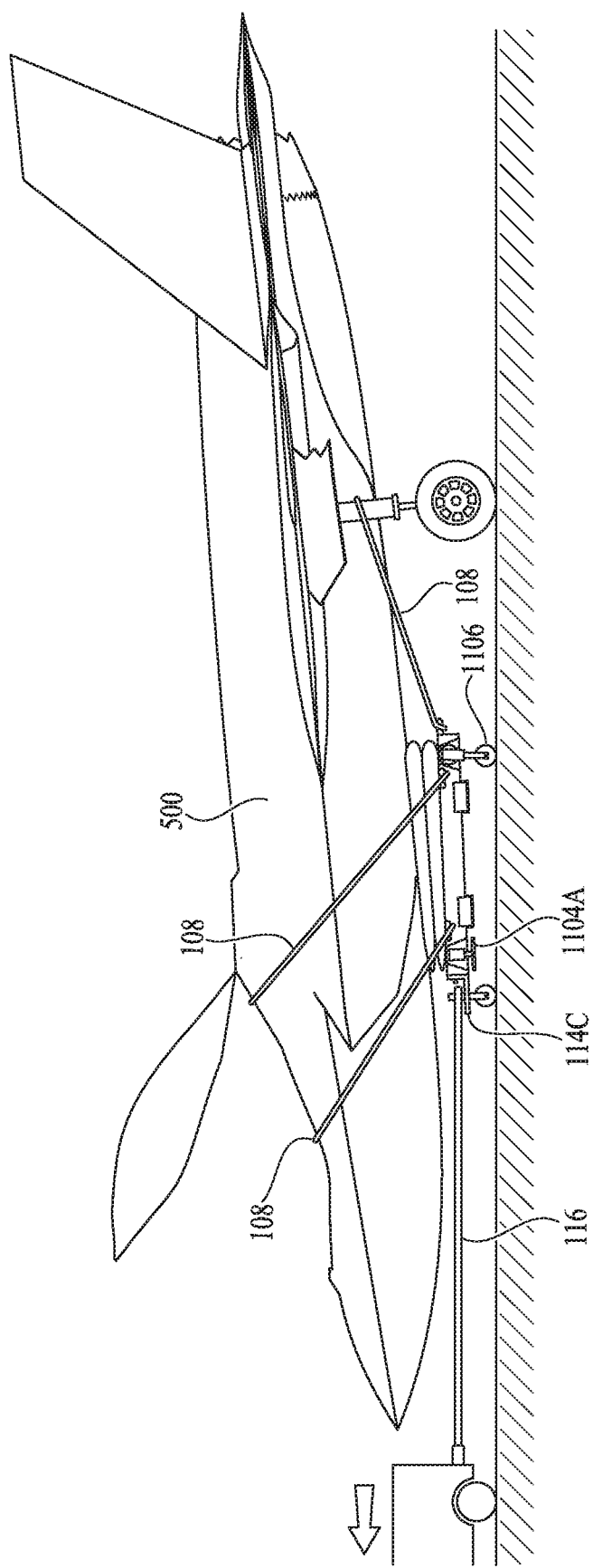

SYSTEM FOR LIFTING AND TRANSPORTING AN AIRCRAFT

CROSS-REFERENCE TO RELATED APPLICATIONS

This application is a continuation-in-part of U.S. patent application Ser. No. 16/901,792, filed Jun. 15, 2020, titled "System for Lifting and Transporting an Aircraft," the contents of which are incorporated by reference in their entirety.

BACKGROUND

Aircraft can suffer landing gear failures, which can result from a hard landing, or as a result of a runway excursion. It is necessary to place the damaged aircraft on jack(s) in order to restore the missing or damaged landing gear.

However, jacks cannot be placed under the forward fuselage as there is insufficient clearance. A method of raising the aircraft is therefore needed, and in many cases, time is of the essence. Existing methods and systems for lifting a disabled aircraft typically utilize large cranes which can take several hours to hours to arrive and require a significant amount of free space around the aircraft in order to get into position and effectively lift the aircraft.

Accordingly, there is a need for an improved system and method for lifting and transporting an aircraft.

SUMMARY

The present invention satisfies this need.

A system for lifting and transporting an aircraft having features of the present invention improves over existing systems and methods and comprises a movable platform, a lower lift system, and a first pair of wheels.

The platform comprises a frame having an upper surface and a lower surface and a plurality of hook ups for attaching ties to the aircraft.

The lower lift system is configured to raise the platform and an aircraft supported by the frame. The lower lift system comprises a lifter selected from the group consisting of at least one hydraulic jack, at least one pneumatic jack, slots for forklift arms, at least one inflatable airbag, and combinations of any or all of the foregoing.

The first pair of wheels is coupled to or configured for coupling to the frame so that the raised platform with an aircraft supported by the platform can be transported.

Optionally, the platform is self-propelled.

Optionally, the system further comprises an upper inflatable airbag system above the upper surface of the platform for raising the aircraft when the upper inflatable airbag system is inflated.

Optionally, the upper inflatable airbag system comprises a plurality of stacked airbags that are independently inflatable.

Optionally, the hook ups comprise hooks, loops, O-rings/D-rings, clamps, and openings in the frame 112 for threading a tie 108 therethrough.

Optionally, the upper inflatable airbag system comprises a single airbag module with a plurality of interior compartments, each compartment capable of being inflated independently of the other compartments.

The airbags can be permanently coupled together.

Optionally, the platform comprises a layer of compressible material coupled to the upper surface of the frame.

Optionally, the system further comprises a plurality of ties that are configured for removably securing the disabled aircraft to the platform.

Optionally, the system further comprises a plate made of a rigid material and having an upper surface for supporting the platform and a lower surface configured for placement on a ground surface, the plate being sufficiently large that wheels coupled to the platform fit on the plate.

Optionally, the system further comprises a tow bar for coupling to the platform.

Optionally, the first pair of wheels are pivotally coupled to the flame pivotable from a generally horizontal position to a generally vertical position.

A method of lifting and transporting an aircraft comprises the steps of:

a) positioning the system for lifting and transporting an aircraft underneath the aircraft;

b) lifting the platform, thereby lifting the aircraft;

c) either pivoting the first pair of wheels from a generally horizontal position to a generally vertical position, or coupling the first pair of wheels to the frame; and d) transporting the aircraft by applying force on the platform.

Step b) can comprise lifting the platform and pivoting the first pair of wheels from the generally horizontal position to the generally vertical position.

Step b) can also comprise lifting a first end of the platform and pivoting the first pair of wheels from the generally horizontal position to the generally vertical position, and, after step b) lifting a second end of the platform.

The method can further comprise the step of after step b) securing the aircraft to the platform using a plurality of ties.

The step of securing the aircraft to the platform can also comprise the step of coupling a third wheel to the second end of the platform.

DRAWINGS

These and other features, aspects and advantages of the present invention will become better understood with reference to the following description, appended claims, and accompanying drawings where:

FIG. 2 is a perspective view of a wheel assembly of the system of FIG. 1;

Figure 1:
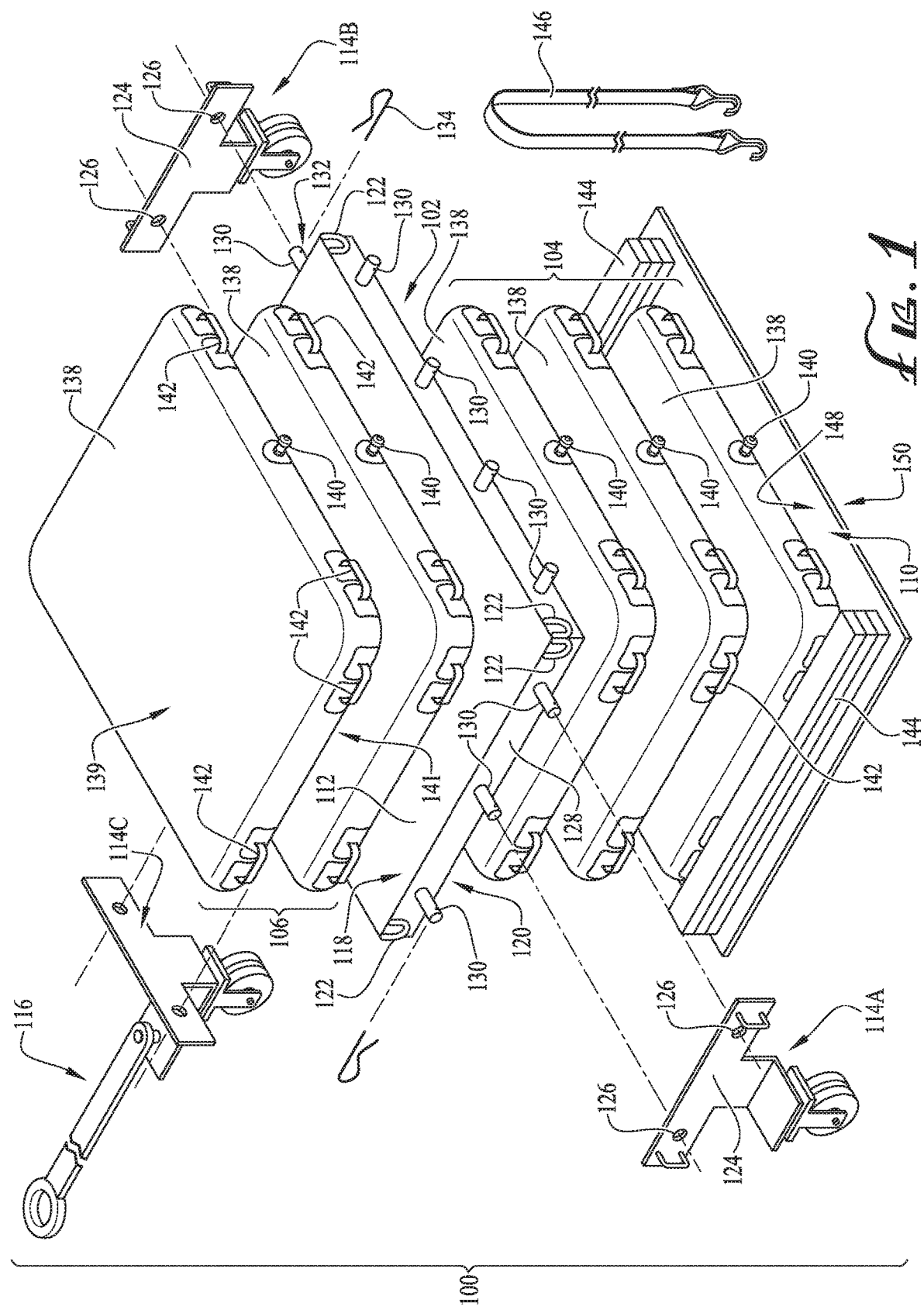
FIG. 1 is an exploded perspective view of a first embodiment of a system lifting and transporting an aircraft.
Figure 5:
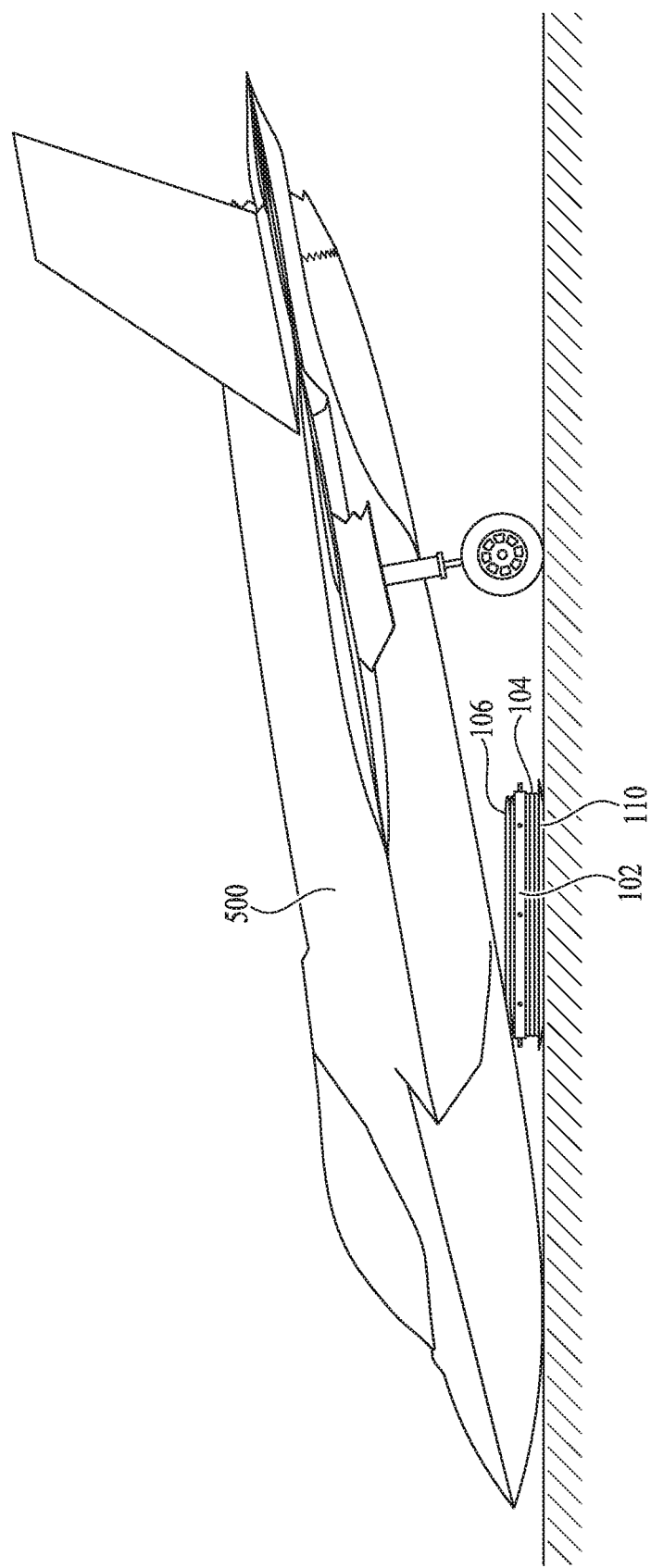
Figure 6:
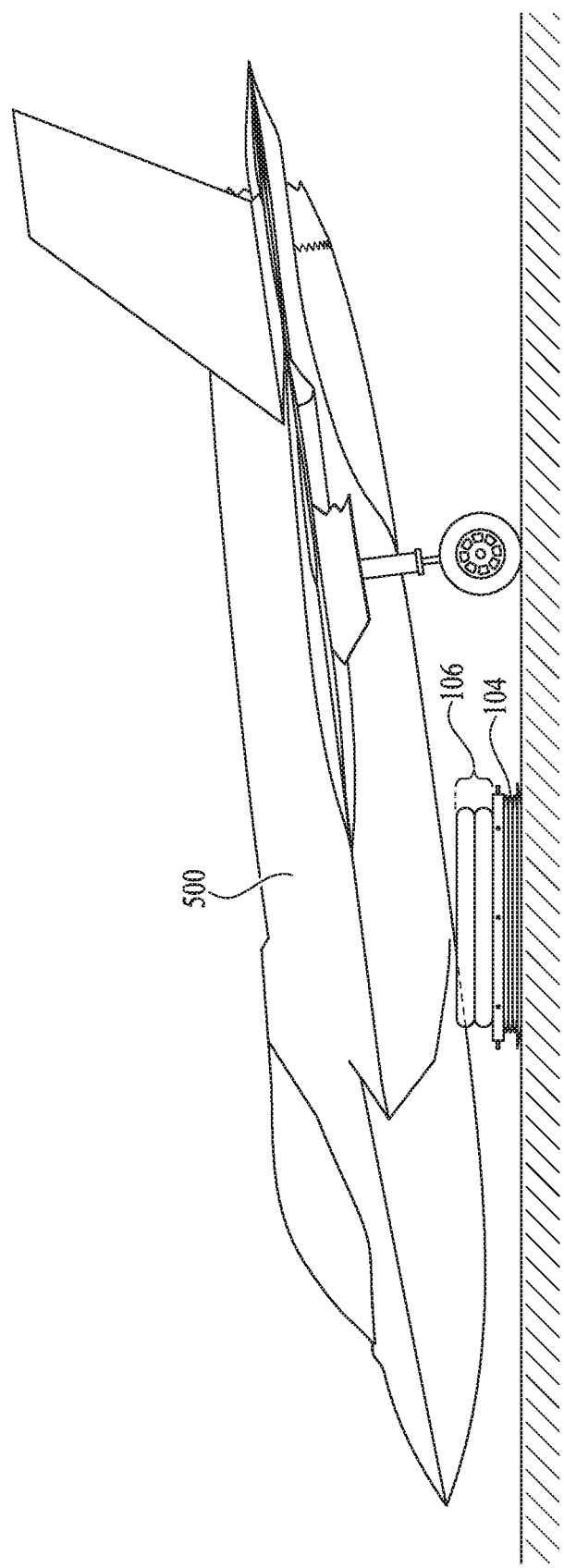
Figure 7:
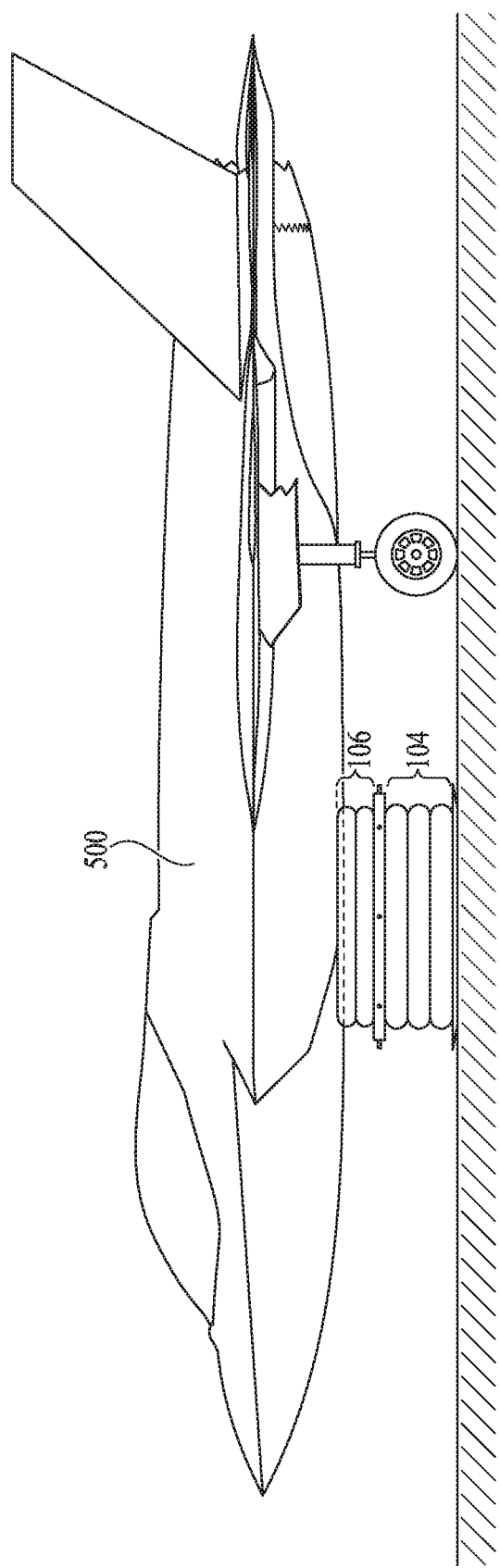
Figure 8:
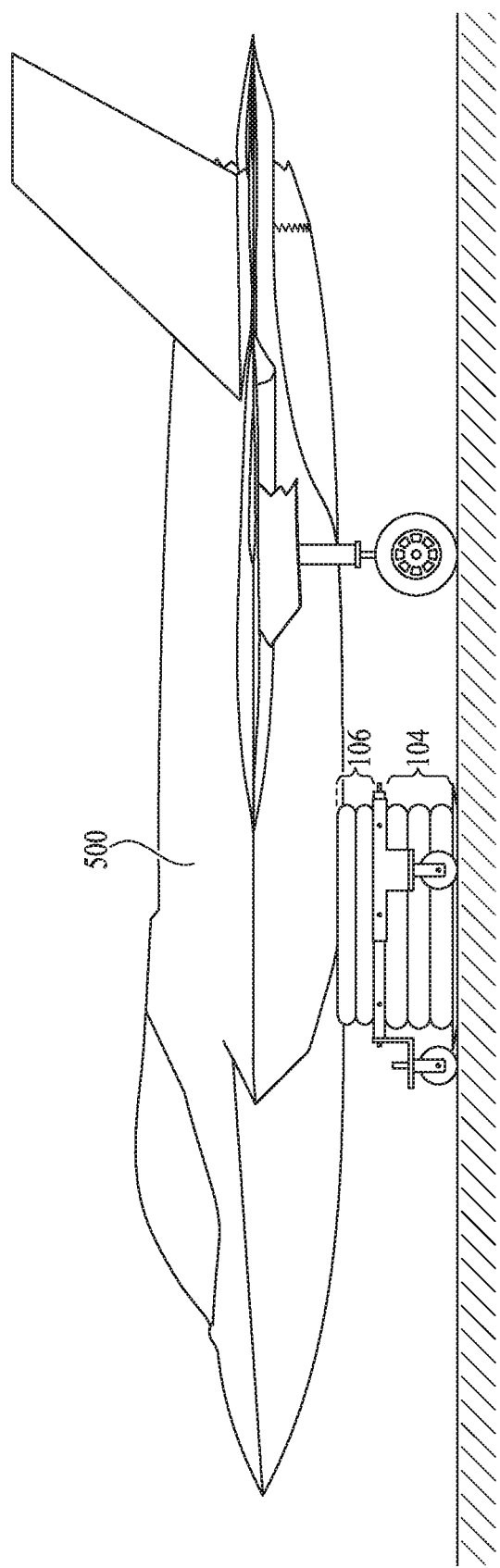
Figure 11:
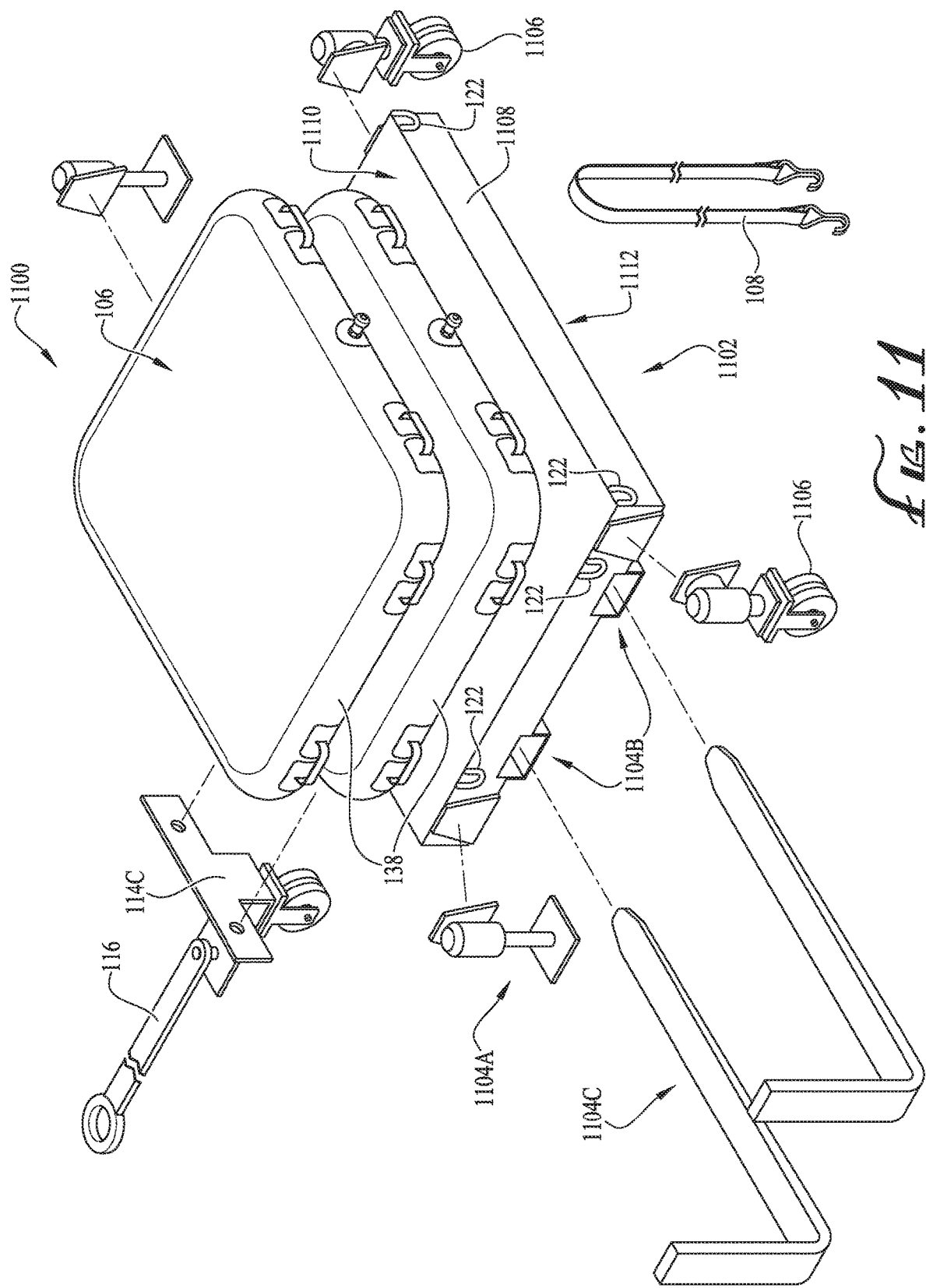

FIG. 3 a front elevation view of the wheel assembly of FIG. 2;

FIG. 4 is a perspective view of an optional airbag system configuration for use with the system of FIG. 1;

FIGS. 5-10 are side elevation views of the system of FIG. 1 as it is used for lifting the aircraft, FIGS. 5 through 10 showing sequential steps of using the system;

FIG. 11 is a perspective view of a second embodiment of a system for lifting and transporting an aircraft; and FIGS. 12-16 are side elevation view of the system of FIG. 11 as it is used for lifting the aircraft, FIGS. 12 through 16 showing sequential steps of using the system.

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," do not exclude other components or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to the drawings, like reference numerals designate identical or corresponding features throughout the several views.

As noted above, and best seen in FIGS. 5 and 12, when an aircraft 500 suffers from a nose landing, or a landing gear failure, there is little to no clearance under the nose of the aircraft 500, and the nose of the aircraft 500 must be lifted in order to transport the aircraft for repair. The sequential steps for performing this operation can be seen in FIGS. 5 through 10 and FIGS. 12 through 16. The present invention is directed to solving this little to no clearance problem in a quick, efficient and cost-saving manner.

Referring to FIG. 1, there is shown a first embodiment of a system 100 for lifting and transporting an aircraft. The system 100 comprises a trailer 102, a lower inflatable airbag system 104, an upper inflatable airbag system 106, a plurality of ties 108, and optionally, a support 110.

The trailer 102 is best seen in FIG. 1 and comprises a rigid frame 112 and at least one pair of wheels 114. Optionally, the system 100 can have a pivoting tow bar 116 that can be attached to the frame 112. The rigid frame 112 has an upper surface 118, a lower surface 120 and a plurality of hook ups 122 for attaching ties 108 to secure the aircraft 500 to the trailer 102. The hook ups 122 can comprise any structure for attaching ties 108 to the trailer 102, such as hooks, loops, O-rings/D-rings, clamps, and openings in the frame 112 for threading a tie 108 therethrough. The frame 112 is made from metal or a high strength composite.

Referring now to FIGS. 2 and 3, the pair of wheels 114 comprises first and second wheel assemblies 114A, 114B configured to be removably coupled to the rigid frame 112. Each wheel assembly 114A, 114B comprises a flat piece of metal or composite 124 with at least two openings 126 therethrough and at least one lift handle 152. The flat piece of metal 124 is configured for positioning up against an exterior surface 128 of the frame 112. The wheel 114 is rotatably coupled to the flat piece of metal 124 so that the wheel 114 can pivot and then roll in any direction. As best seen in FIG. 3, each wheel assembly 114 can have a directional wheel lock 136 for locking the corresponding wheel to perform straight line movement.

As best seen in FIG. 1, there are a plurality of rods 130 spaced around the exterior surface 128 of the frame 112 for coupling the wheels 114 thereto. Each rod 130 extends from the exterior surface 128 of the frame 112 and through the openings 126 in the flat piece of metal 124 of the corresponding wheel assembly 114. Each rod 130 has an opening 132 through its distal end for insertion of a lock pin 134 therethrough to prevent the wheel assembly 114 from disengaging from the rod 130. As there are a plurality of rods 130 spaced around the exterior surface 128 of the frame 122, the wheels 114 can be attached to any of the rods 130, permitting the user to adjust the position of the wheels 114 as necessary depending on the environment/situation. As noted above, more than one pair of wheels 114 can be coupled to the frame 122.

Optionally, the wheels 114 can be bolted to the frame 112 and the rods 130 are used as guide pins rather than a coupling mechanism. Optionally, no rods 130 are used at all.

As best seen in FIG. 1, the pivoting tow bar 116 is configured to be removably coupled to the exterior surface 128 of the frame 112. This allows the trailer 102 to perform multi-directional positioning under an aircraft. Because the trailer 102 can be pulled from any exterior surface 128 (and not just a front surface like a more traditional trailer), the trailer 102 is not limited to one specific placement for towing to be possible. Additionally, because the tow bar 116 is removable and repositionable on the frame 112, the direction of tow can be altered during operation. For example, the tow bar 116 can be coupled to a left side of the frame 112, used to pull the aircraft in one direction, and then the tow bar 116 can be removed from the left side of the frame 112 and coupled to a right side of the frame 112, and used to pull the trailer 102/aircraft 500 in a second direction. As shown in FIG. 1, the tow bar 116 can optionally be coupled to a third wheel assembly 1140, and the third wheel assembly 114C can removably couple to the frame 112. The third wheel assembly 1140 provides extra support for the trailer 102.

Optionally the tow bar can be permanently affixed to the frame 112.

Preferably the trailer 102 is sufficiently strong to support a load of at least 40 tons (80000 lbs), and the upper surface 118 has an area of 4.5 m×2.3 m (177"×90"). This allows the trailer 102 to be used with airbags of various sizes and capacities, irrespective of the manufacturer.

The lower inflatable airbag system 104 is configured for placement below the lower surface 120 of the trailer 102, and when the lower inflatable airbag system 104 is inflated, the trailer 102 is raised to towing height, such as about 20" to about 30" above ground surface. Once at trailer towing height, the trailer 102 has enough ground clearance for the wheels 114 to be coupled to the trailer 102. The upper inflatable airbag system 106 is configured for placement above the upper surface 118 of the trailer 102 and when the upper inflatable airbag system 106 is inflated, the aircraft 500 is raised to aircraft towing height. Optimal towing height of the aircraft 500 is the height the aircraft 500 would normally sit at if the landing gear were functional and supporting the aircraft 500. This height will vary depending on the type of aircraft but is typically around 44 inches. However, it is possible that that towing height can be less than 44 inches and the aircraft 500 can be in a slightly nose-down configuration, rather than a normal "landing gear functional" height.

Optionally, both the lower airbag system 104 and or the upper airbag system 106 each comprises a plurality of stacked airbags 138 that are independently inflatable. The plurality of stacked airbags 138 can be completely independent of each other, removably coupled together, or permanently coupled together. By permanent it is meant that the airbags 138 cannot be separated without making it impossible to deflate or inflate the airbags 138, or, the airbags 138 have a common surface. Patches of hook and loop fasteners 406 can be used to stack and removably hold the airbags 138 in contact with each other. FIG. 4 shows the hook and loop fasteners 406 on an airbag 400.

Optionally, the top-most airbag 138, 402 in the upper airbag system 106 is a contoured or a split-top bag to aid in contouring or shape adaption to an aircraft 500 with wings that have steep dihedral angles.

Optionally, the upper surface 139 of the top-most airbag 138, 402 of the upper airbag system 102 is a non-slip surface to aid in gripping the aircraft 500. Optionally, the lower surface 141 of the upper airbag system 106 is also a non-slip surface to aid in gripping the upper surface 118 of the trailer 102.

Optionally, as best shown in FIG. 4, the lower airbag system 104 and or the upper airbag system 106 or both each comprises a single airbag module 400 with a plurality of interior compartments 402, each compartment 402 capable of being inflated independently of the other compartments 402.

The airbags 138, 400, 402 used in the airbag systems 104, 106 can have any capacity and be made from any semi-flexible material, but preferably the airbags 138, 400, 402 have a 15-ton capacity and are made from a woven neoprene coated reinforced fabric. This fabric provides a long life expectancy and maintains high stability and durability during operation. Optionally, the fabric of the airbags 138, 400, 402 can be coated with other material such as, but not limited to, polyurethane or polyvinyl chloride (PVC). Each airbag 138, 400, 402 can have a lifting height of 200 mm (8 inches). As noted above, a plurality of airbags 138, 400, 402 can be used to achieve the necessary lift height for the specific aircraft being lifted. Each airbag 138, 400, 402 can be inflated individually, giving the operator complete control over the lifting of the aircraft 500 as well as maintaining the maximum amount of rigidity. For safety, each airbag 138, 400, 402 can be fitted with a pressure relief valve to prevent accidental over inflation. Inlet valves 140 with a non-return valve allow a filling hose to be disconnected without the airbag 138, 400, 402 deflating.

Optionally, each airbag 138, 400, 402 has two inlet valves 140, where one of the valves 140 is fitted with a pressure relief valve and the other valve 140 is fitted with an inflation coupling that attaches to the inflation hose. Optionally, each airbag 138, 400, 402 has at least one handle 142 coupled to an exterior surface so that a user can easily maneuver the airbags 138, 400, 402 into place.

Figure 9:
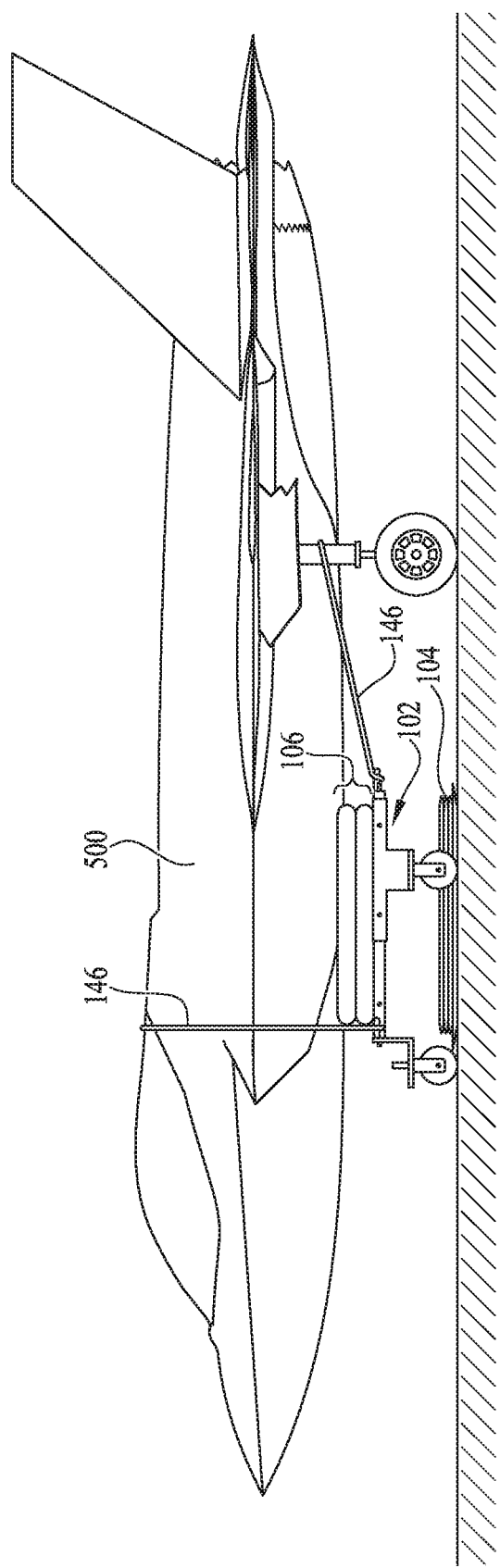
Figure 10:
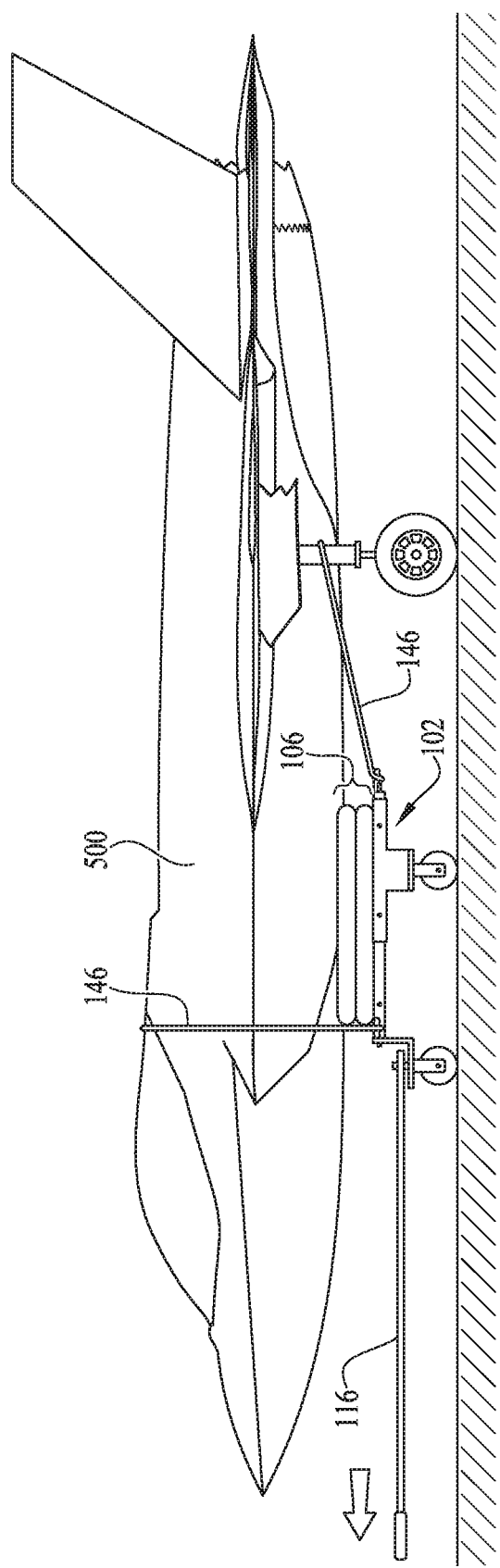

The plurality of ties 146 is used for removably securing the disabled aircraft 500 to the trailer 102. The ties 146 are shown in FIGS. 1, 9 and 10 and comprise any semi-flexible means to secure the aircraft 500 to the trailer 102, including but not limited to, straps, chains, cords, ropes, etc.

The support 110 comprises at least a section; and preferably the entire support 110; is made of at least one layer of rigid material. The support 110 has an upper surface 148 and a lower surface 150. The lower surface 150 of the support 110 is configured for placement on the ground surface and the lower inflatable airbag system 104 is configured for placement on the upper surface 148 of the support 110.

Optionally, at least one pair of side supports 144 is placed on top of the support 110, on either side of the lower airbag system 104. This is shown in FIG. 1. The side supports 144 provide a rigid surface for supporting the trailer 102 until the lower airbag system 104 inflates and the lower airbag system 104 can support weight of the trailer 102.

Referring now to FIGS. 5-10, a method of using the system 100 comprises:

a) placing the system 100 for lifting and transporting an aircraft underneath the aircraft 500;
b) inflating the upper inflatable airbag system 106;
c) inflating the lower inflatable airbag system 104;
d) attaching the plurality of wheels 114 to the frame of the trailer 102;
e) securing the aircraft 500 to the trailer 102 using the plurality of ties;
f) deflating the lower inflatable airbag system 104; and
g) transporting the aircraft 500 by exerting a force on the trailer 102.

Typically, the system 100 is placed under the aircraft 500, between main landing gear 502 and nose landing gear (not shown because the aircraft 500 suffered nose landing gear failure).

The system 100 of step a or may not include a support 110, as a support 110 may not be needed/used.

Optionally, in step b), the support 110 is placed on the ground surface first, with the lower airbag system 104 placed on the upper surface 148 of the support 110, and at least one pair of side supports 144 can be placed on the upper surface 148 of the support 110, with the lower airbag system 104 positioned between the pair of side supports 144. This is shown in FIG. 1. As noted above, the side supports 144 provide a rigid surface for supporting the trailer 102 until the lower airbag system 104 inflates and can support the trailer 102.

Optionally, step d) can be performed before step c).

Optionally, before step g), step h) coupling a tow bar to an external surface of the frame.

Optionally, in step b) if the upper inflatable airbag system comprises a plurality of stacked airbags, the plurality of airbags can be inflated individually and sequentially, to slowly lift the nose of the aircraft off the ground surface. The same method can be used if the upper inflatable airbag system comprises a single airbag module with multiple internal compartments. The multiple internal compartments can be inflated individually and sequentially.

Optionally, in step c) if the lower inflatable airbag system comprises a plurality of stacked airbags, the plurality of stacked airbags are inflated individually and sequentially, so that the trailer is lifted slowly and in steps. The same method can be used if the lower inflatable airbag system comprises a single airbag module with multiple internal compartments. The multiple internal compartments can be inflated individually and sequentially.

Preferably steps (b)-(e) in the order listed but can be performed in any order.

The invention has many advantages, including the following:

The system 100 as compared to conventional crane systems can be more quickly transported to a disabled or downed aircraft 500 suffering from landing gear failure because the components of the system 100 can fit into or be towed by a utility vehicle, such as a pick-up truck. Utility vehicles typically can travel at faster speeds than conventional crane systems. The system 100 can be deployed quickly. Since a utility vehicle is smaller and more agile than a large crane truck, the system 100 can be driven to an aircraft 500 that is in a hard location to reach. A prior art crane has a very difficult time reaching an aircraft 500 in a remote location.

The system 100 can be placed under a fuselage with very low ground clearance (12" or less). Initially, only the support 110, the trailer 102 and the lower and upper inflatable airbag systems 104, 106 need to fit under the fuselage;

The wheels 114 need only be attached to the trailer 102 after the trailer 102 has been lifted by the lower airbag system 104. This make the trailer 102 easier to move into place as the wheels 114 are not attached during system 100 installation.

The system 100 is lightweight for ease of positioning.

The cost to repair the system 100 is lower than repairing the traditional lifting crane because the airbags 138, 400 can be independently replaced if the systems uses independent airbags.

The wheels 114 have directional locking for straight-line movement. Without the directional lock engaged, the wheels 114 are free to rotate and move in any direction, giving the trailer 102 a wide range of motion.

The system 100 is capable of operation on soft or firm surfaces.

The system 100 is compatible with many standard airbags up to 40 ton.

The trailer 102 can be towed from all sides, making it highly adaptable to the environment the aircraft 500 must be recovered from.

The system 100 has a low initial cost and requires minimal maintenance as compared to the prior art cranes.

The system 100 has a low insertion height, making it ideal for lifting low clearance aircraft that have suffered landing gear failure.

The entire system 100 can be stored in a shipping container, making it easy to store and transport as no special equipment is required.

Referring now to FIG. 11, there is shown a second embodiment of the present invention, wherein a system 1100 for lifting and transporting an aircraft comprises a movable platform 1102, a lower lift system 1104, and a first pair of wheels 1106.

The platform 1102 comprises a frame 1108 having an upper surface 1110 and a lower surface 1112 and a plurality of hook ups for attaching ties to the aircraft. The platform 1102 can be self-propelled or the platform 1102 can be pulled/pushed using an outside power source such as a tow vehicle.

The platform 1102 can comprise an upper inflatable airbag system 106 disposed above the upper surface 1110 of the platform 1102 for raising the aircraft 500 when the upper inflatable airbag system 106 is inflated. The upper inflatable airbag system 106 is discussed above in the first embodiment. Optionally, the airbags 138 that make up the upper inflatable airbag system 106 can be side by side on the platform 1102.

Optionally, the platform 1102 can comprise a layer of compressible material coupled to the upper surface of the frame.

The lower lift system 1104 is configured to raise the platform 1102 and an aircraft supported by the platform 1102. The lower lift system 1104 comprises a lifter selected from the group consisting of: at least one hydraulic jack 1104A, at least one pneumatic jack 1104A, slots for forklift arms 1104B, at least one inflatable airbag (any element or combination of elements disclosed above as part of the lower inflatable airbag system 104), and combinations of any or all of the foregoing. FIG. 11 also shows a pair of forklift arms 11040 for insertion into slots 1104B.

In FIG. 11, element 1104A refers to both a pneumatic jack or a hydraulic jack, whichever the user desires to use. The jacks 1104A can either be coupled to an external surface of the frame 1108, as shown in FIGS., or the jacks 1104A can be a separate unit that is placed/located underneath the frame 1108 to lift the frame 1108 from the bottom Optionally, the pneumatic/hydraulic jack 1104A are pivotally coupled to the platform 1102 such that the jack 1104A are pivotable from a generally horizontal position to a generally vertical position, much like the wheels 1106 are able to do.

The advantage of this lower lift system 1104 is that the actual lifting of the platform 1102 (and aircraft resting thereon) is performed more quickly than the lifting performed by the lower inflatable airbag system 104 used in the first embodiment. Accordingly, if time is of the essence, the lower lift system 1104 of the second embodiment is beneficial. Moreover, a forklift can be used to position the platform 1102 in place under the aircraft 500 and can assist in lifting the platform 1102, thus contributing the greater lifting speed of the lower lift system 1104. It should be noted that the platform 1102 of the second embodiment can be used with the lower inflatable airbag system 104 of the first embodiment if the user so desires.

The first pair of wheels 1106 are either coupled to or configured for coupling to the frame 1108 so that the raised platform 1102 with an aircraft 500 supported by the platform 1102 can be transported. If the first pair of wheels 1106 is coupled to the frame 1108, preferably the first pair of wheels 1106 is pivotally coupled to the frame 1108 such that the wheels 1106 are pivotable from a generally horizontal position seen in FIG. 12 to a generally vertical position shown in FIGS. 11 and 13 through 16. This configuration is beneficial because the wheels 1106 are already coupled to the platform 1102, so there is no need to take the extra step of attaching them. With the wheels 1106 in the horizontal position, the platform 1102 can be placed under the aircraft 500 and requires no extra clearance to accommodate the wheels 1106.

Optionally, the wheels 1106 each comprise their own pneumatic/hydraulic lifting mechanism incorporated therein. This is shown in FIGS. 13 and 14, Wherein the lifting of the platform 1102 is achieved by the wheels 1106 themselves effectuating the lifting of one end of the platform 1102.

Optionally, the system 1100 further comprises a plate 110 made of a rigid material and having an upper surface 148 for supporting the platform 1102 and a lower surface 150 configured for placement on a ground surface. The plate 110 is sufficiently large that wheels 1106 coupled to the platform 1102 fit on the plate 110.

The system 1100 can further comprise a plurality of ties 108 for removably securing the disabled aircraft 500 to the platform 1102. The ties 108 comprise any semi-flexible means to secure the aircraft 500 to the platform 1102, including but not limited to, straps, chains, cords, ropes, etc.

The hook-ups 122 can comprise any structure for attaching ties 108 to the platform 1102, such as hooks, loops, O-rings/D-rings, clamps, and openings in the frame 1108 for threading a tie 108 there through.

Optionally, like the first embodiment 100 discussed above, the system 1100 can further comprise a tow bar 116 for coupling to the platform 1102. The tow bar 116 can optionally be coupled to a wheel assembly 1140, and the wheel assembly 1140 can removably couple to the frame 1108. The wheel assembly 1140 provides extra support for the platform 1102.

Figure 12:
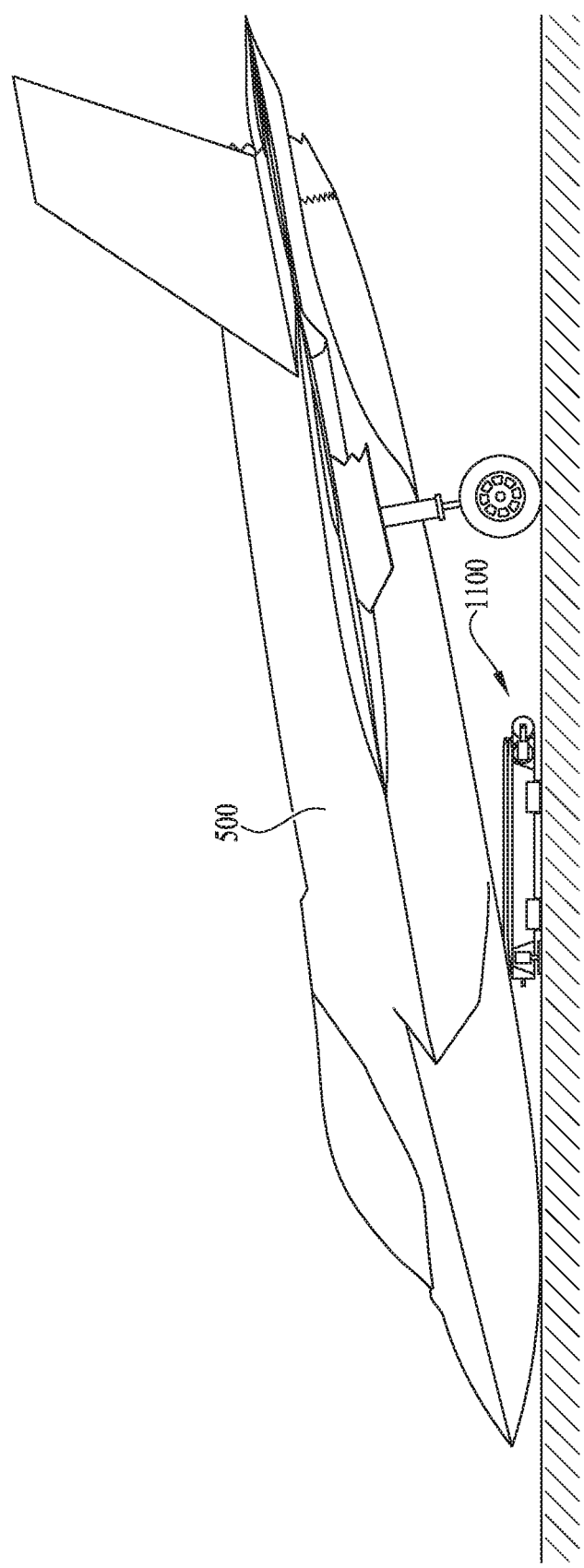

Referring now to FIGS. 12-16, a method of using the system 1100 comprises:

a) positioning the platform 1102 underneath the aircraft 500 (FIG. 12);

b) lifting the platform 1102 and pivoting the first pair of wheels 1106 from the generally horizontal position to the generally vertical position (FIG. 13);

c) securing the aircraft 500 to the platform 1102 using a plurality of ties 108 (FIG. 15); and d) transporting the aircraft 500 by pulling on the tow bar 116 (FIG. 16).

Optionally, step b) comprises the steps of lifting a first end of the platform 1102 and pivoting the first pair of wheels 1106 from the generally horizontal position to the generally vertical position, and lifting a second end of the platform (FIG. 14). The lifting of the first and second ends of the platform 1102 is achieved using a forklift, a hydraulic/ pneumatic lifting mechanism 1104A (either a separate device or incorporated into the wheels 1106), or a combination of both.

Optionally, step b) comprises lifting the platform 1102, thereby lifting the aircraft 500, and after step b), step c) comprises either pivoting the first pair of wheels 1106 from a generally horizontal position to a generally vertical position, or coupling the first pair of wheels 1106 to the frame 1108.

While particular forms of the invention have been illustrated and described, it will also be apparent to those skilled in the art that various modifications can be made without departing from the spirit and scope of the invention.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

What is claimed is:

1. A system for lifting and transporting a disabled aircraft, the system comprising:
   a) a towable, movable platform configured to support the disabled aircraft, the platform comprising:
      i) an upper surface and a lower surface;
      ii) a plurality of hook-ups for attaching ties to the aircraft;
   b) a support made of a rigid material and having an upper surface and a lower surface configured for placement on a ground surface;
   c) a lower inflatable airbag system configured to raise the platform and an aircraft supported by the platform, the lower airbag system comprising a single stack of a plurality of lower airbags permanently coupled together, wherein each lower airbag has edges with the edges of the lower airbags vertically aligned, the lower inflatable airbag system being configured for placement on the upper surface of the support;
   d) an upper inflatable airbag system directly on the upper surface of the platform for raising a front portion of the aircraft when the upper inflatable airbag system is inflated, the upper airbag system comprising a single stack of a plurality of upper airbags permanently coupled together, wherein each upper airbag has edges with the edges of the upper airbags vertically aligned;
   e) wheels configured to be removably coupled to the frame so that the raised platform with the aircraft supported by the platform can be transported;
   f) a tow bar configured to be removably coupled to the platform for towing the platform; and
   g) a plurality of ties for removably securing the aircraft to the platform with the hookups;
   wherein when both the upper and lower inflatable airbag systems are deflated, and the wheels are not positioned to contact the ground surface, the system has a height that is 12 inches or less for fitting beneath the disabled aircraft, and when the lower inflatable airbag system is inflated, the platform is about 20 inches to about 30 inches above the ground surface.

2. The system of claim 1, wherein the wheels are coupled to the frame and are pivotable from a first position wherein the wheels do not contact the ground surface, to a second position wherein the wheels do contact the ground surface.

3. The system of claim 1, wherein the hook ups comprise hooks, loops, O-rings, D-rings, clamps, and openings in the platform for threading said plurality of ties therethrough.

4. The system of claim 1, wherein the platform comprises a layer of compressible material coupled to the upper surface of the platform.

5. A system for lifting and transporting a disabled aircraft, the system comprising:
   a) a towable, movable platform configured to support the disabled aircraft, the platform comprising:
      i) an upper surface and a lower surface;
      ii) a plurality of hook-ups for attaching ties to the aircraft;
   b) a support made of a rigid material and having an upper surface and a lower surface configured for placement on a ground surface;
   c) a lower inflatable airbag system configured to raise the platform and an aircraft supported by the platform, the lower airbag system comprising a single airbag module with a plurality of interior compartments, each compartment capable of being inflated independently of the other compartments, wherein each compartment has edges, and the edges of all the compartments are vertically aligned, the lower inflatable airbag system being configured for placement on the upper surface of the support;
   d) an upper inflatable airbag system directly on the upper surface of the platform for raising a front portion of the aircraft when the upper inflatable airbag system is inflated, the upper airbag system comprising a single airbag module with a plurality of interior compartments, each compartment capable of being inflated independently of the other compartments, wherein each compartment has edges, and the edges of all the compartments are vertically aligned;
   e) wheels configured to be removably coupled to the platform so that the raised platform with the aircraft supported by the platform can be transported;
   f) a tow bar configured to be removably coupled to the platform for towing the platform; and
   g) a plurality of ties for removably securing the aircraft to the platform with the hookups;
   wherein when both the upper and lower inflatable airbag systems are deflated, and the wheels are not positioned to contact the ground surface, the system has a height that is 12 inches or less for fitting beneath the disabled aircraft, and when the lower inflatable airbag system is inflated, the platform is about 20 inches to about 30 inches above the ground surface.

6. The system of claim 5, wherein the wheels are coupled to the frame and are pivotable from a first position wherein the wheels do not contact the ground surface, to a second position wherein the wheels do contact the ground surface.

7. The system of claim 5, wherein the hook ups comprise hooks, loops, O-rings, D-rings, clamps, and openings in the platform for threading said plurality of ties therethrough.

8. The system of claim 5, wherein the platform comprises a layer of compressible material coupled to the upper surface of the platform.

* * * * *